Oct. 13, 1959     M. F. MILLEA ET AL     2,908,851
VOLTAGE SENSITIVE SEMICONDUCTOR CAPACITOR
Filed July 21, 1958
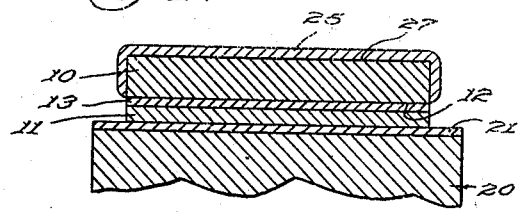
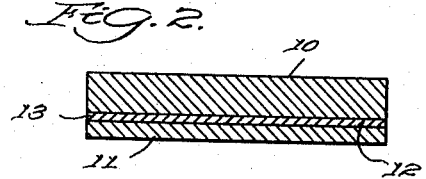
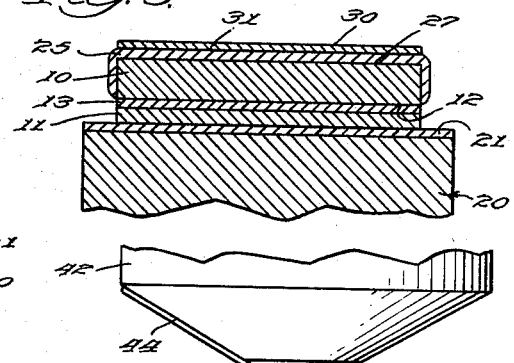
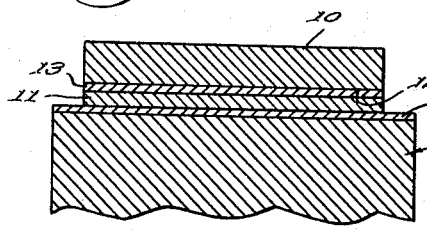
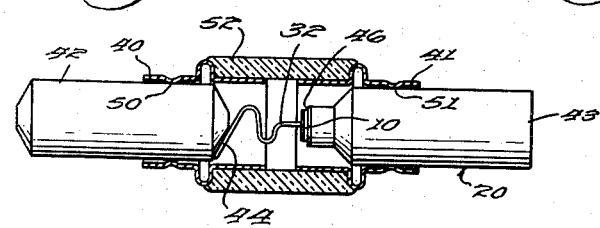
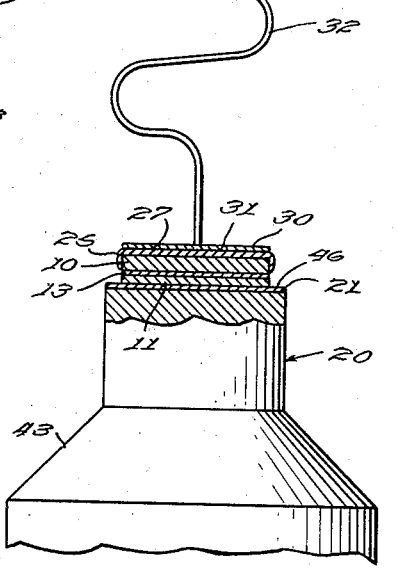
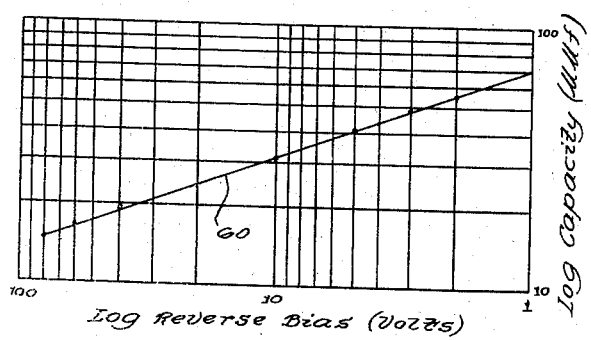
INVENTORS:
Michael F. Millea
and Joe B. Holland.
By Spensley and Horn
Att'ys.

United States Patent Office 2,908,851
Patented Oct. 13, 1959

2,908,851

VOLTAGE SENSITIVE SEMICONDUCTOR CAPACITOR

Michael F. Millea, Redondo Beach, and Joe B. Holland, Los Angeles, Calif., assignors to Pacific Semiconductors, Inc., Culver City, Calif., a corporation of Delaware Application July 21, 1958, Serial No. 750,001

7 Claims. (Cl. 317—236)

This invention relates to semiconductor devices and more particularly to semiconductor devices suitable for use as voltage sensitive capacitors.

Non-linear or voltage sensitive capacitors are used in a wide variety of applications. Among the prior art devices which have been used as voltage sensitive capacitors are reactance tubes, barium titanate capacitors, speaker driven air capacitors and more recently, semiconductor devices. Such capacitors afford a means of varying circuit capacitance by control of an applied bias voltage; they are especially useful in circuits for voltage tuning, frequency modulation, automatic frequency control, and the like.

Each of the above mentioned prior art voltage sensitive capacitors have certain limitations. The barium titanate type capacitors tend to have their parameters vary with temperatures. The sensitivity of these barium titanate devices, i.e., the variation of capacitance with variation in applied bias voltage, is generally too small. Further, the capacitance of the device at any given voltage is not generally as large as may sometimes be desired.

Reactance tubes have a substantial power requirement, are relatively expensive and require considerable associated circuitry to make them operative. They are also relatively large and therefore may not be used where miniaturization is a goal.

Speaker driven air capacitors have a relatively slow rate of permissible variation of capacitance with applied voltage, are difficult to adjust and have an upper frequency range of approximately 30 kilocycles. These speaker driven capacitors have a further shortcoming similar to reactance tubes in that they also draw substantial power and are of a relatively large volume, making miniaturization of the associated circuitry impossible.

Present art voltage sensitive semiconductor crystal capacitors have a relatively small capacitance at a given voltage and are also expensive to manufacture.

In the semiconductor art, a region of semiconductor material containing an excess of donor impurities and yielding an excess of free electrons is considered to be an impurity-doped N-type region. An impurity-doped P-type region is one containing an excess of acceptor impurities resulting in a deficit of electrons, or an excess of holes. Stated differently, an N-type region is one characterized by electron conductivity, whereas a P-type region is one characterized by hole conductivity. When a continuous, solid crystal specimen of semiconductor material has an N-type region adjacent a P-type region the boundary between the two regions is termed a P–N or an N–P junction, or simply a junction. Such a specimen of semiconductor material is termed a junction semiconductor device and may be used as a rectifier. A solid crystal specimen having two such junctions is termed a transistor. In addition to the junction type semiconductor devices, the point contact type and diffused junction type semiconductor devices are also now well known to the art. The term semiconductor material as utilized herein is considered generic to germanium, silicon and germanium-silicon alloys, and is employed to distinguish these semiconductors from metallic oxide semiconductors such as copper oxide and selinium.

The present invention voltage sensitive semiconductor crystal capacitor overcomes all of the above difficulties attendant with the prior voltage sensitive capacitors. The present invention capacitor has an especially high capacitance at a given voltage, is relatively sensitive to changes in applied bias voltage and is easy to manufacture, hence making it inexpensive.

It is generally known that silicon or other semiconductor junction devices when biased in the reverse direction exhibit variable capacitance. For the fused junction type of device, the capacitance generally varies as the inverse of the reverse square root of the applied bias voltage. The capacitance vs. voltage relationship can, however, be made to obey laws or modes of variations other than that of the inverse square root law by using methods of junction fabrication other than fusion. In fact it has been found by the inventors that a semiconductor device without including a P–N junction at all, in the technical sense, can be made to obey an inverse ⅓ power law of capacitance vs. voltage.

A semiconductor junction diode, when biased in the reverse direction, appears to small A.-C. signals essentially as a resistance and a capacitance in series. The value of these equivalent circuit parameters for a given device, is determined by the amplitude of the applied D.-C. bias. These parameters are, of course, also a function of the material from which the device is made, the geometry of the device, and the mode of manufacture of the device.

It has been found by the inventors that satisfactory voltage sensitive semiconductor capacitors may be produced which are mechanically stable and which, because of their small size, ideally lend themselves to miniaturization. The present invention voltage sensitive semiconductor capacitor has a small power requirement, is easy to produce and requires few if any critical manufacturing operations.

In accordance with the presently preferred embodiment of this invention there is deposited a thin film (of the order of $10^{-4}$ cm.) of polysiloxane upon the surface of an N-type silicon semiconductor crystal body. It has been found desirable, but not necessary, to use low resistivity silicon as the crystal material, e.g. of the order of 10 ohm-centimeters. The silicon body is ohmically mounted upon a relatively large electrode. Upon the surface opposite the electrode there is deposited an evaporated gold film. A cat-whisker is used to make contact to the evaporated gold film.

It is therefore an object of this invention to provide a semiconductor electrical translating device including a polysiloxane film deposited upon a semiconductor crystal body.

It is another object of this invention to provide a semiconductor voltage sensitive crystal capacitor of improved reliability.

It is a further object of this invention to provide a semiconductor voltage sensitive crystal capacitor which is relatively easy to produce and therefore inexpensive to manufacture.

A still further object of this invention is to provide a semiconductor voltage sensitive crystal capacitor which has a larger capacitance at a given voltage than do present art devices.

Yet another object of this invention is to provide a silicon semiconductor voltage sensitive crystal capacitor which is an inherently simpler structure that has heretofore been produced.

While the novel and distinctive features of the invention are particularly pointed out in the appended claims, a more expository treatment of the invention, in principle and in detail, together with additional objects and advantages thereof, is afforded by the following description and accompanying drawing in which like reference characters are used to refer to like parts throughout the various views.

In the drawing:

Figure 1 is a cross-sectional view of a cylindrically shaped silicon semiconductor crystal die which is the basic building block of the present invention device;

Figure 2 is a cross-sectional view of the die of Figure 1 upon the bottom surface of which a layer of gold has been evaporated;

Figure 3 is a cross-sectional view of the crystal of Figure 1 during a later stage of fabrication;

Figure 4 is a cross-sectional view showing the device in accordance with the present invention during an intermediate stage of fabrication;

Figure 5 is a cross-sectional view of the device of the present invention during a later stage of fabrication;

Figure 6 is a cross-sectional view of a completed device in accordance with the presently preferred embodiment of this invention prior to being placed within a package;

Figure 7 is a view, partly in section showing the device of Figure 6 as housed in a prior art hermetically sealed package; and Figure 8 is a graph in which the capacitance of the device of Figure 6 is plotted as ordinate against the reverse bias voltage applied to the device as abscissa.

Referring now to the drawing and particularly to Figure 1, there is shown for purposes of example only a semiconductor wafer or die 10 which is preferably a silicon wafer of a diameter of approximately 60 mils and thickness of 10–25 mils sliced from a single silicon crystal.

For purposes of example only, it will be assumed that the wafer or die is N-type conductivity silicon of a low resistivity, of the order of 10 ohm-centimeters. It will be understood, however, that P-type silicon may also be used and that different resistivity material is also permissible. Further, germanium or germanium-silicon alloy may also be used as the semiconductor crystal material in accordance with the present invention. Of course, the use of "dice" of different dimensions or different materials, or of different resistivity will result in appropriate changes in the parameters of the completed device as will be understood by one skilled in the art.

Referring now to Figure 2, the crystal 10 of Figure 1 is shown as it will appear after a layer 11 of doped i.e., impurity activated gold has been deposited over the back surface 12 thereof. A typical dopant may be a gold-arsenic alloy containing ½ to 1% arsenic. The crystal 10 with the gold layer 11 is heated to temperatures between 360° and 380° C. to produce a gold-silicon eutectic. This intermediate gold-silicon layer is designated as 13 in Figure 2. The gold layer 12 is deposited in order to produce a satisfactory back contact to the crystal for the subsequent mounting of an electrode thereto. It is preferable, although not necessary, to dope the gold with a dopant of the same conductivity type (herein N-type conductivity), as that of the semiconductor crystal material.

In Figure 3 an electrode 20 is shown to be mechanically and electrically bonded to the gold layer 11 by means of solder 21. Typically, the solder will be made of lead and the electrode will be made of copper in accordance with well-known prior art practices.

After the electrode 20 is soldered to the gold layer 11 the entire crystal is placed in an etch solution which may consist of one part hydrofluoric acid, one part nitric acid and one part acetic acid. Other prior art etches may also be used. The subassembly of Figure 3 is thereafter quickly transferred (in approximately 0.3 second) from the etch to an ethyl alcohol bath and rinsed well. It is then transferred to a mixture which may typically contain about 75 parts by volume of ethyl alcohol, 75 parts by volume of water and 10 parts by volume of ethyl triethoxysilane and pulled slowly through the interface of this solution.

The mixture in the above mentioned components are reacted; that is the ethyltriethoxysilane is hydrolized by the water and the ethyltrihydroxysilane that is formed thereby floats to the surface of the mixture forming an interface with the water alcohol solution. With the solution in this condition, the wafer to be coated is dipped down through the ethyltrihydroxysilane and water and the ethyl alcohol interface and drawn back through the ethyltrihydroxysilane thus coating the silicon wafer with a very thin homogeneous film of ethyltrihydroxysilane. The wafer is then transferred to an oven and heated to a temperature in the range from 100° C. to 200° C. for a period of not less than twelve hours.

The above described surface treatments, which are more fully described and claimed in co-pending U.S. patent application entitled Improved Surface Treatment of Semiconductor Bodies by Stanley Pessok and Alan L. Harrington and Method and Means for Forming Passivation Films on Semiconductor Bodies by Alan L. Harrington and Thomas C. Hall, Serial Nos. 749,624 and 749,620, both filed concurrently herewith, and assigned to the assignee of the present invention. The first surface treatment described in the Pessok and Harrington et al. applications is used in exactly the manner described therein as the quench technique hereinabove described to produce the underlying film upon which the thicker film is deposited by the above mentioned dipping procedure. The thicker film depositing method described herein is essentially the same as that set forth in the Harrington and Hall application above referred to. Some differences, however, exist. In the Harrington and Hall method either ethyltri, ethyldi, or ethylmono ethoxysilanes may be used, while in the present invention it has been found that only trifunctional silanes may be used.

The trifunctional monomers which may be employed have the general formula: $RSiX_3$ where R is a monovalent hydrocarbon radical (methyl, ethyl, phenyl, etc.) and X is a reactive group such as an alkoxy group (methoxy, ethoxy, etc.) or a group such as hydroxy, mercapto, amino, or a halide group. The particularly preferred compound for this use is hydrolyzed ethyl triethoxy silane.

Further, in the Harrington and Hall process, a catalyst such as zinc, tin or lead octoate is employed. In the present invention no catalyst at all need be used. Finally, additional alcohol is added as indicated hereinabove, while no alcohol is added in the Harrington and Hall process, the alcohol therein being produced as a by-product of the reaction. While ethyl alcohol is the preferred alcohol to be added in accordance with the present invention, this is not a necessary limitation. Any other water miscible alcohol may be substituted for the ethyl alcohol.

The above procedure leaves a thin polysiloxane film 25 approximately 5000 A. in thickness upon the surface 27 of the crystal 10 as may best be sen in Figure 4. Generally, the film thickness will be in the range from 500 A. to about 25 microns. The film is then partially cured at a temperature in the range from 100° C. to 150° C. for about one hour, thereby producing a self-sustaining film by the evaporation of volatiles present.

It has been verified by the inventors that rectification takes place at a semiconductor film interface which is believed to be due to the surface states near the semiconductor crystal surface. Under certain conditions it is possible for these surface states to bend the energy bands of the semiconductor near the surface so that a potential barrier to the flow of free carriers exists. The rectification characteristics will depend upon the potential barrier and how uniform this barrier is over the semiconductor film interface. Point contacts which are well known to the art are used to decrease the area of the metal semiconductor contact thereby increasing the probability that the barrier will be uniform over the interface.

The rectification and/or voltage sensitive variable capacitor effect is found existant between the upper evaporated thin gold layer 11 (hereinafter to be discussed) and the lower ohmic contact as previously described.

Referring now to Figure 5, there is shown the subassembly of Figure 4 with a thin gold layer 30 deposited upon the upper surface 31 of the partially cured polysiloxane film 25. While the layer 30 has been designated herein as being gold, it will be understood that any other good conductor which may conveniently be deposited by evaporation or the like upon the polysiloxane film 25 is equally applicable. After deposition of the gold layer 30, the assembly is heated to a temperature in the range from about 150° to 200° C. for a period of at least six hours. During this curing, the polysiloxane layer 25 is transformed into a space polymer or cross-linked polymer of the trifunctional silane compound.

In Figure 6 a cat-whisker 32 formed in the well known S-shape is shown to be in contact with the gold film 30. The cat-whisker may be of molybdenum, tungsten, or any other material known to the art.

In Figure 7 there is shown a view partly in section, of a completed semiconductor device constructed in accordance with the present invention as it might appear housed in a well known present art hermetically sealed package. Herein beaded tubes 40 and 41 have inserted therein metal pins or electrodes 42 and 43. At the end 44 of pin 42 there is welded the resilient whisker element or cat-whisker 32 while semiconductor crystal 10 is ohmically bonded to end 46 of pin 41 in a manner as has hereinabove been explained. The tubes 40 and 41 are welded as indicated at 50 and 51 to the metal pins 42 and 43. A central glass envelope 52 is sealed to both tubes 40 and 41 as shown to complete the hermetic seal of the package. This exemplary package is more fully shown and described in U.S. Patent No. 2,815,474 entitled Glass Sealed Semiconductor Rectifier by W. M. Lewis, Jr., et al., issued December 3, 1957.

Referring now to Figure 8 there is shown a curve 60 which indicates the relationship of the log to the base 10 of capacitance in micro microfarads of a device such as shown in Figure 6 as a function of the log to the base 10 of the amplitude of the reverse bias voltage in volts. This particular curve was plotted for a device produced in accordance with the present invention which was fabricated from a material having a resistivity of two ohm centimeters, N-type silicon. The upper gold layer 30 was of an area of $10^{-2}$ square centimeters. If the resistivity of material is increased with all other parameters remaining constant, the curve 60 will move downwardly and vice-versa. This particular device results in a substantially straight line relationship. The relationship of capacitance to bias voltage from Figure 8 is $C=kV-0.35$ where $k$ equals 7000 $\mu\mu f./cm.^2$.

There has thus been described a new and novel voltage sensitive semiconductor device which may also function as a rectifier element.

While the principles of the invention have been set forth hereinabove, it will be immediately obvious to those skilled in the art that many modifications in structure, arrangement and proportions of the elements and components of the invention may be made without departing from the principles of the invention. The appended claims are therefore intended to cover and embrace any such modifications within the limits only of the true spirit and scope of the invention.

What is claimed is:

1. A semiconductor electrical translating device comprising: a semiconductor crystal body; a polysiloxane space polymer film disposed upon a first area of said body; a layer of a conducting material disposed over said film; a cat-whisker in point contact with said layer of conducting material; and an electrode in ohmic contact with a second area of said body.

2. A semiconductor electrical translating device comprising: a silicon semiconductor crystal body; a polysiloxane space polymer film disposed upon a first area of said body, said film being of a thickness in the range from 500 A. to 25 microns; a layer of gold disposed over said said film; a cat-whisker in contact with said layer of gold; and an electrode in ohmic contact with a second area of said body.

3. A semiconductor electrical translating device comprising: a germanium semiconductor crystal body; a polysiloxane space polymer film disposed upon a first area of said body, said film being of the order of 5000 A. in thickness; a layer of gold disposed over said film; a cat-whisker in point contact with said layer of gold; and an electrode in ohmic contact with a second area of said body.

4. A semiconductor voltage sensitive variable capacitor comprising: a substantially cylindrical silicon semiconductor body; a space polymer polysiloxane film disposed over one of the end faces of said body, said film being of the order of 5000 A. in thickness; a layer of gold disposed over said film; a cat-whisker in point contact with said layer of gold; and an electrode in low resistance contact with the other end face of said crystal body.

5. A semiconductor voltage sensitive variable capacitor comprising: a low resistivity silicon semiconductor crystal body; a space polymer polysiloxane film disposed over one surface of said body, said film being of the order of 5000 A. in thickness; a first layer of gold, said first layer being disposed over said film; a cat-whisker in point contact with said layer of gold; a second layer of gold, said second layer being disposed upon a second surface of said body, said second surface being opposite said first surface; and in electrode in low resistance contact with said second layer of gold.

6. A semiconductor electrical translating device comprising: a silicon semiconductor crystal body of a predetermined conductivity type; a space polymer polysiloxane film disposed over a first area of said body; a first layer of a conducting material disposed over said film; a cat-whisker in point contact with said layer of conducting material; and a second layer of a conducting material disposed over a second area of said body, said second area not being covered by said polysiloxane film, said second layer of conducting material including a small quantity of an active impurity which is of the same conductivity determining type as that of said body.

7. The method of making a semiconductor electrical translating device which comprises: coating said device with a trifunctional silane monomer; heating the resulting coating until the volatiles contained therein are removed thereby leaving a self-sustaining thin film over said device; applying an electrically conductive metal over said self-sustaining film; and thereafter curing the film under conditions sufficient to convert said film into a polysiloxane space polymer.

No references cited.